(12) United States Patent
Ogata

(10) Patent No.: US 12,219,237 B2
(45) Date of Patent: Feb. 4, 2025

(54) RECORDING MODE CHANGING DEVICE, NETWORK CAMERA, RECORDING MODE CHANGING METHOD, AND PROGRAM RECORDING MEDIUM

(71) Applicant: NEC Corporation, Tokyo (JP)

(72) Inventor: Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 44 days.

(21) Appl. No.: 18/017,573

(22) PCT Filed: Jul. 31, 2020

(86) PCT No.: PCT/JP2020/029393
§ 371 (c)(1),
(2) Date: Jan. 23, 2023

(87) PCT Pub. No.: WO2022/024333
PCT Pub. Date: Feb. 3, 2022

(65) Prior Publication Data
US 2023/0308739 A1    Sep. 28, 2023

(51) Int. Cl.
*H04N 23/61* (2023.01)
*G06V 20/58* (2022.01)
*G08G 1/04* (2006.01)
*H04N 23/667* (2023.01)

(52) U.S. Cl.
CPC ........... *H04N 23/61* (2023.01); *G06V 20/584* (2022.01); *G08G 1/04* (2013.01); *H04N 23/667* (2023.01)

(58) Field of Classification Search
CPC ..... H04N 23/61; H04N 23/667; G06V 20/584
USPC ........................................ 348/220.1
See application file for complete search history.

(56) References Cited

U.S. PATENT DOCUMENTS

2005/0237934 A1* 10/2005 Mito ................. G08G 1/07
370/232
2017/0267178 A1* 9/2017 Shiga .................. G06V 20/588

FOREIGN PATENT DOCUMENTS

| JP | 2001-229487 A | 8/2001 |
| JP | 2009-217400 A | 9/2009 |
| JP | 2016-130960 A | 7/2016 |
| JP | 2017-091244 A | 5/2017 |
| JP | 2018-174553 A | 11/2018 |

OTHER PUBLICATIONS

International Search Report for PCT Application No. PCT/JP2020/029393, mailed on Sep. 29, 2020.
English translation of Written opinion for PCT Application No. PCT/JP2020/029393, mailed on Sep. 29, 2020.

* cited by examiner

*Primary Examiner* — Joel W Fosselman

(57) ABSTRACT

This recording mode changing device is provided with: a means for determining, according to the lighting status of the lamps of a prescribed traffic signal, whether or not it is necessary to change the data recording mode of a prescribed camera; and a means for changing the data recording mode of the prescribed camera in accordance with the determination result.

9 Claims, 15 Drawing Sheets

Fig. 5

| STAGE NUMBER | CAPTURE PARAMETER | ... | REMARKS |
|---|---|---|---|
| 1 | VGA 480/30fps | | VEHICLE SIGNAL: GREEN PEDESTRIAN SIGNAL: BLUE |
| 2 | VGA 480/30fps | | VEHICLE SIGNAL: GREEN PEDESTRIAN SIGNAL: BLUE BLINKING |
| 3 | VGA 480/30fps | | VEHICLE SIGNAL: GREEN PEDESTRIAN SIGNAL: RED |
| 4 | Full-HD 1080/60fps | | VEHICLE SIGNAL: YELLOW PEDESTRIAN SIGNAL: RED |
| 5 | Full-HD 1080/60fps | | VEHICLE SIGNAL: RED (ALL RED) PEDESTRIAN SIGNAL: RED (ALL RED) |
| 6 | Full-HD 1080/60fps | | VEHICLE SIGNAL: RED PEDESTRIAN SIGNAL: RED |
| .. | .. | .. | .. |
| N | Full-HD 1080/60fps | | VEHICLE SIGNAL: RED (ALL RED) PEDESTRIAN SIGNAL: RED (ALL RED) |

Fig. 9

| CHANGE CONDITION OF CAPTURE PARAMETER | CAPTURE PARAMETER |
|---|---|
| VEHICLE SIGNAL: GREEN<br>PEDESTRIAN SIGNAL: BLUE | VGA<br>480/30fps |
| VEHICLE SIGNAL: YELLOW<br>PEDESTRIAN SIGNAL: RED | Full-HD<br>1080/60fps |
| VEHICLE SIGNAL: RED<br>PEDESTRIAN SIGNAL: RED | Full-HD<br>1080/60fps |

Fig. 12

| STAGE NUMBER | CAPTURE PARAMETER | ... | REMARKS |
|---|---|---|---|
| 1 | TIME-LAPSE MODE INTERVAL IMAGING AT n SECONDS | | VEHICLE SIGNAL: GREEN PEDESTRIAN SIGNAL: BLUE |
| 2 | TIME-LAPSE MODE INTERVAL IMAGING AT n SECONDS | | VEHICLE SIGNAL: GREEN PEDESTRIAN SIGNAL: BLUE BLINKING |
| 3 | TIME-LAPSE MODE INTERVAL IMAGING AT n SECONDS | | VEHICLE SIGNAL: GREEN PEDESTRIAN SIGNAL: RED |
| 4 | Full-HD 1080/60fps | | VEHICLE SIGNAL: YELLOW PEDESTRIAN SIGNAL: RED |
| 5 | Full-HD 1080/60fps | | VEHICLE SIGNAL: RED (ALL RED) PEDESTRIAN SIGNAL: RED (ALL RED) |
| 6 | Full-HD 1080/60fps | | VEHICLE SIGNAL: RED PEDESTRIAN SIGNAL: RED |
| ... | ... | ... | |
| N | Full-HD 1080/60fps | | VEHICLE SIGNAL: RED (ALL RED) PEDESTRIAN SIGNAL: RED (ALL RED) |

Fig. 13

| STAGE NUMBER | CAPTURE PARAMETER | REMARKS |
|---|---|---|
| 1 | Full-HD 1080/60fps | VEHICLE SIGNAL: GREEN PEDESTRIAN SIGNAL: BLUE |
| 2 | Full-HD 1080/60fps | VEHICLE SIGNAL:GREEN PEDESTRIAN SIGNAL: BLUE BLINKING |
| 3 | Full-HD 1080/60fps | VEHICLE SIGNAL: GREEN PEDESTRIAN SIGNAL: RED |
| 4 | VGA 480/30fps | VEHICLE SIGNAL: YELLOW PEDESTRIAN SIGNAL: RED |
| 5 | VGA 480/30fps | VEHICLE SIGNAL: RED (ALL RED) PEDESTRIAN SIGNAL: RED (ALL RED) |
| 6 | VGA 480/30fps | VEHICLE SIGNAL: RED PEDESTRIAN SIGNAL: RED |
| ⋮ | ⋮ | ⋮ |
| N | VGA 480/30fps | VEHICLE SIGNAL: RED (ALL RED) PEDESTRIAN SIGNAL: RED (ALL RED) |

RECORDING MODE CHANGING DEVICE, NETWORK CAMERA, RECORDING MODE CHANGING METHOD, AND PROGRAM RECORDING MEDIUM

This application is a National Stage Entry of PCT/JP2020/029393 filed on Jul. 31, 2020, the contents of all of which are incorporated herein by reference, in their entirety.

TECHNICAL FIELD

The present invention relates to a recording mode changing device, a network camera, a recording mode changing method, and a program recording medium.

BACKGROUND ART

PTL 1 discloses an example of a traffic monitoring device that monitors a monitoring target on the basis of an image of a camera provided facing a road. According to the literature, it is described that the traffic monitoring device includes a magnification control means that controls a magnification mechanism of a camera to increase an imaging magnification when an event such as an accident occurs (see claim 2).

Although not explicitly described in PTL 1, an image captured by a camera that captures an inside of an intersection is also stored in order to leave the image as evidence of an accident or traffic violation. PTL 2 discloses an image capturing device including a storage unit that captures an image by using stage information received from a traffic signal controller as a trigger, stores captured image data for a predetermined period, and records and stores the image data.

In a fixed point photographing camera or the like including a camera that photographs the inside of the intersection, it is known that an image greatly changes depending on a photographed environment. PTL 3 discloses an image processing device that changes an interval at which an interframe difference is performed on the basis of the environment information.

CITATION LIST

Patent Literature

[PTL 1] JP 2001-229487 A
[PTL 2] JP 2017-91244 A
[PTL 3] JP 2009-217400 A

SUMMARY OF INVENTION

Technical Problem

The following analysis is given by the inventor. Since the fixed point camera disclosed in PTLs 1 to 3 can acquire a large amount of image data, typically, as in PTL 2, processing of deleting image data stored in a storage unit after a predetermined time limit has elapsed is performed (see paragraph 0032 of PTL 2).

However, it is a matter of course that the method of PTL 2 cannot confirm the image data after the lapse of the predetermined time limit. In PTL 3, the erasure of the image data is not explicitly described, but if the storage capacity exceeds the storage capacity of the storage device used in the image management DB 20 of the same literature, it is necessary to erase the past image. As a countermeasure, if the capacity of the storage device that stores the image is increased, the cost increases, and the load on the network for transferring the image also increases. As another measure, it is conceivable to reduce the resolution or the like of the image to reduce the data, but in this case, there is a problem that necessary image analysis or the like cannot be performed.

An object of the present invention is to provide a recording mode changing device, a network camera, a recording mode changing method, and a program recording medium that can contribute to a reduction in the amount of image data obtained by the fixed point camera or the like.

Solution to Problem

According to a first aspect, there is provided a recording mode changing device including: a means configured to determine whether it is necessary to change a data recording mode of a predetermined camera according to a lighting state of a lamp of a predetermined traffic signal; and a means configured to change a data recording mode of the predetermined camera according to a result of the determination.

According to a second aspect, there is provided a network camera including: a camera unit; a means configured to determine whether it is necessary to change a data recording mode of the camera unit according to a lighting state of a lamp of a predetermined traffic signal; and a means configured to change a data recording mode of the camera unit according to a result of the determination.

According to a third aspect, there is provided a recording mode changing method that causes a computer to execute: determining whether it is necessary to change a data recording mode of a predetermined camera according to a lighting state of a lamp of a predetermined traffic signal; and changing a data recording mode of the predetermined camera according to a result of the determination. The method is linked to a specific machine, a computer, which changes the data recording mode of the predetermined camera.

According to a fourth aspect, there is provided a computer program for achieving the function of the computer described above is provided. The computer program can be recorded in a computer-readable (non-transitory) storage medium. That is, the present invention can also be embodied as a computer program product.

Advantageous Effects of Invention

According to the present invention, it is possible to reduce the amount of image data obtained by the fixed point camera or the like.

BRIEF DESCRIPTION OF DRAWINGS

FIG. 5 is a diagram illustrating an example of setting information held by a traffic signal control device according to the first example embodiment of the present invention.

FIG. 9 is a diagram illustrating an example of setting information held by the traffic signal control device according to the first example embodiment of the present invention.

FIG. 12 is a diagram illustrating another example of setting information held by the traffic signal control device of the present invention.

FIG. 13 is a diagram illustrating another example of setting information held by the traffic signal control device of the present invention.

EXAMPLE EMBODIMENT

Figure 1:
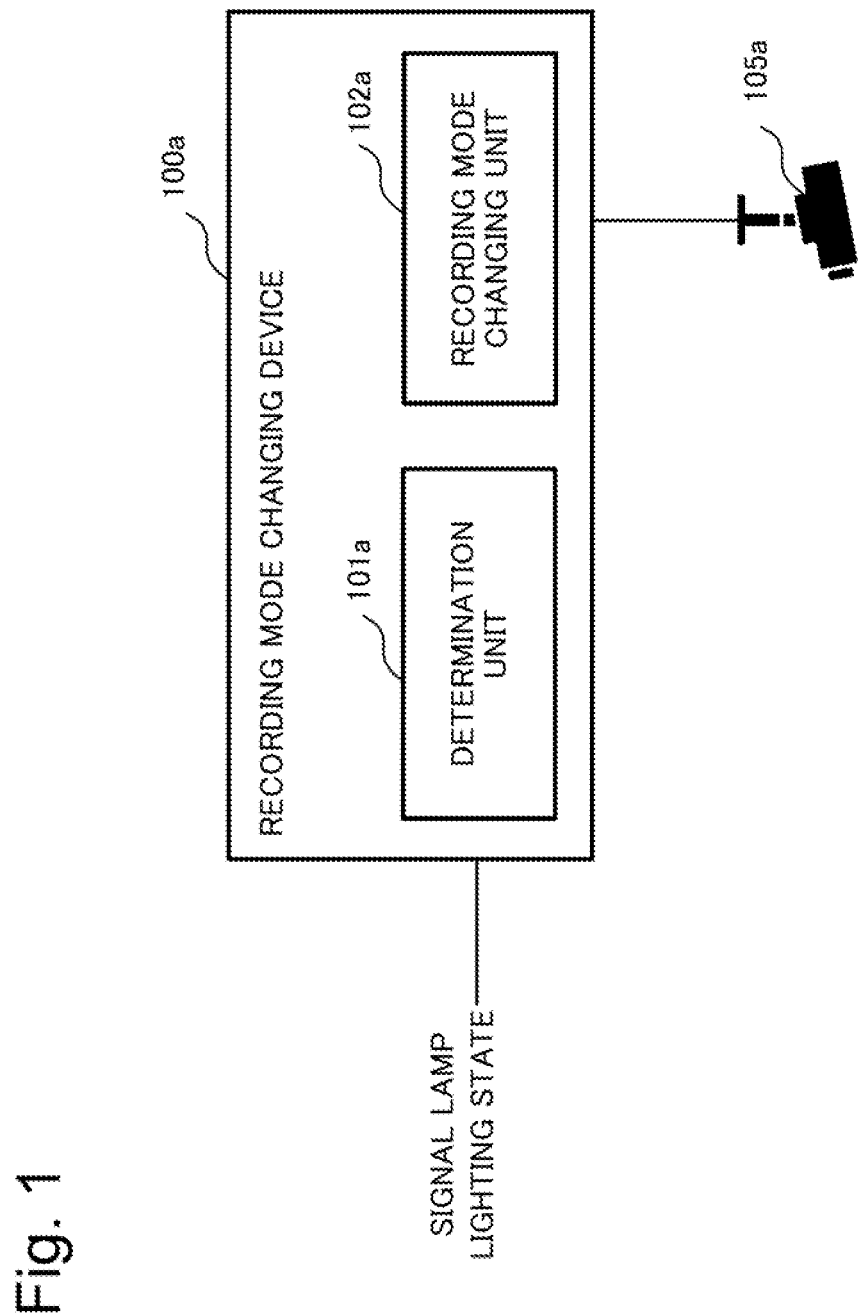
FIG. 1 is a diagram illustrating a configuration of one example embodiment of the present invention.

First, an outline of an example embodiment of the present invention will be described with reference to the drawings. The reference numerals in the drawings attached to this outline are attached to each element for convenience as an example for assisting understanding, and are not intended to limit the present invention to the illustrated aspects. Connection lines between blocks in the drawings and the like referred to in the following description include both bidirectional and unidirectional. The unidirectional arrow schematically indicates a flow of a main signal (data), and does not exclude bidirectionality. Although there are ports and interfaces at connection points of input and output of each block in the drawing, they are not illustrated. In the following description, "A and/or B" is used to mean at least one of A and B.

In one example embodiment of the present invention, as illustrated in FIG. 1, the present invention can be achieved by a recording mode changing device 100a connected to a camera 105a. The recording mode changing device 100a includes a determination unit 101a and a recording mode changing unit 102a.

The determination unit 101a functions as a means configured to determine whether it is necessary to change the data recording mode of a predetermined camera according to the lighting state of the lamp of the predetermined traffic signal. Here, the "data recording mode" refers to various data recording modes that can be accompanied by a change in the amount of data recorded by the camera, such as a change in image quality and a change between a moving image and a still image.

The recording mode changing unit 102a functions as a means configured to change the data recording mode of the predetermined camera according to the determination result by the determination unit 101a.

Figure 2:
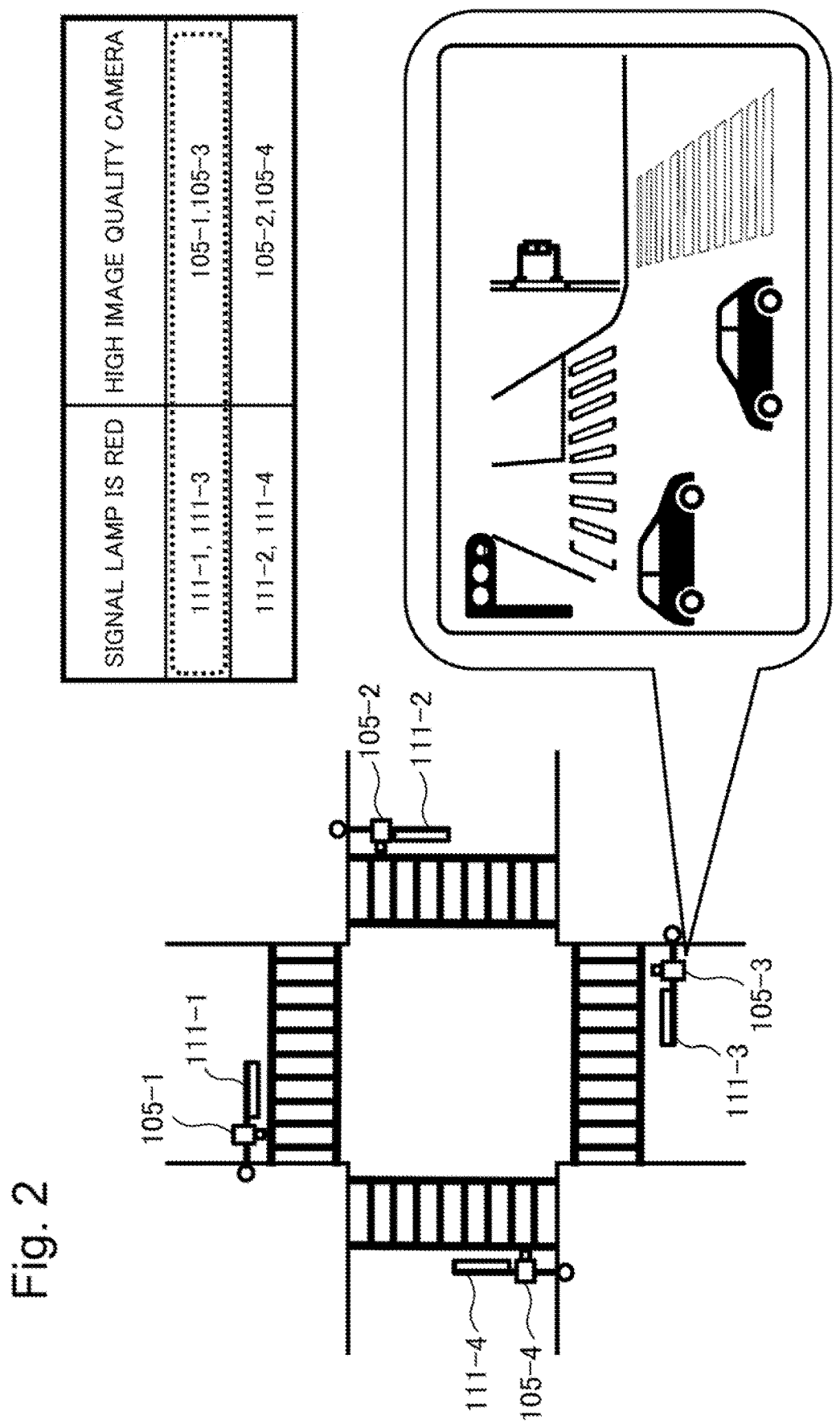
FIG. 2 is a diagram for explaining an operation of one example embodiment of the present invention.
Figure 3:
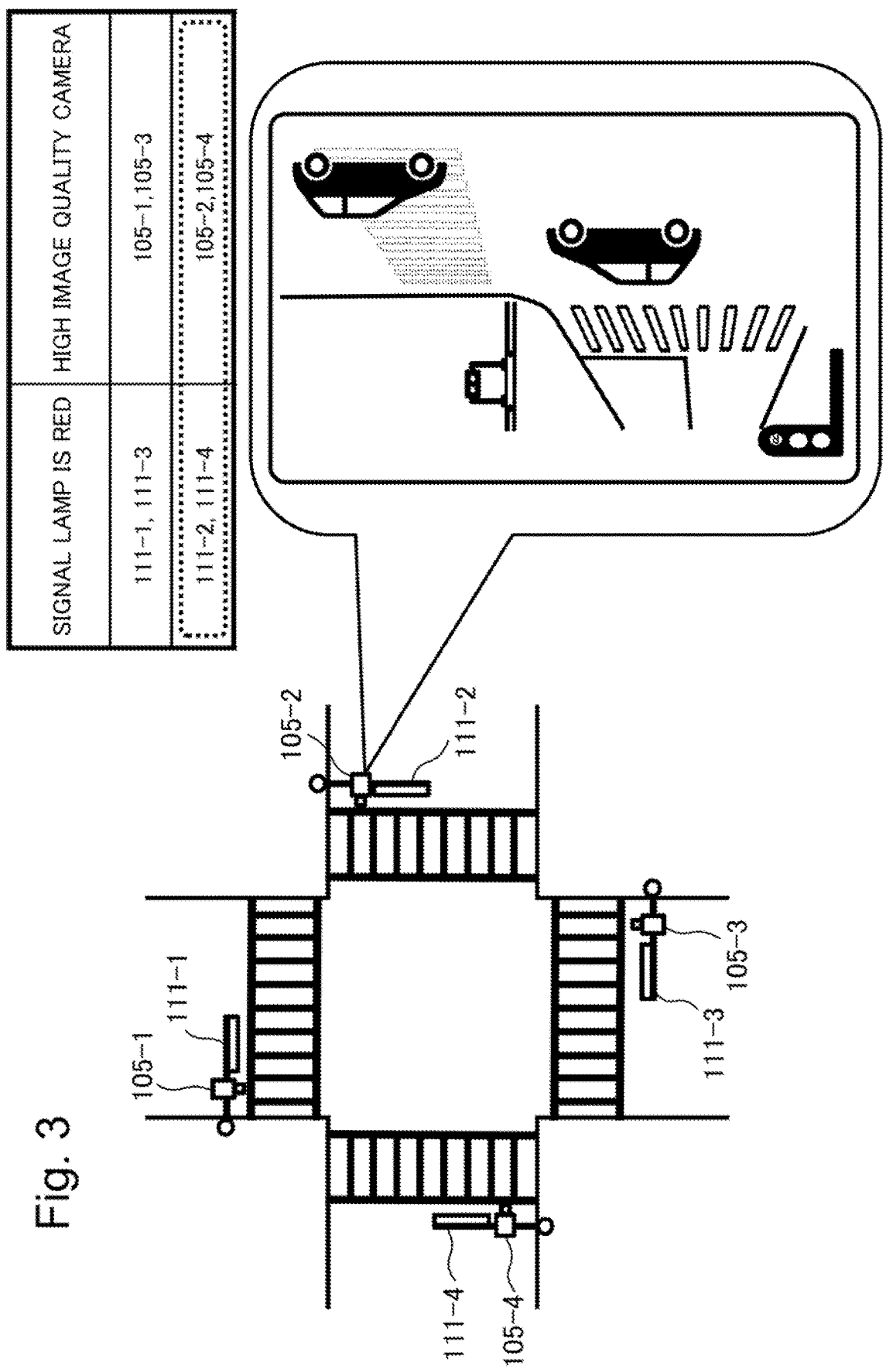
FIG. 3 is a diagram for explaining an operation of one example embodiment of the present invention.

For example, the recording mode changing device 100a changes the recording mode by cameras 105-1 to 105-4 provided side by side with traffic signals 111-1 to 111-4 at the intersections illustrated in FIGS. 2 and 3. For example, when the lights of the traffic signals 111-1 and 111-3 are red, the recording mode changing device 100a changes the recording mode of the cameras 105-1 and 105-3 to a high image quality mode in which imaging is performed with higher image quality than usual. As a result, as illustrated in FIG. 2, the camera 105-3 can capture an image of a vehicle or the like traveling in the intersecting direction of the intersection with high image quality. At this time, since the cameras 105-2 and 105-4 perform imaging in a normal mode with lower image quality than the high image quality mode, the amount of image data can be reduced as compared with the case where the entire cameras 105-1 to 105-4 are operated in the high image quality mode.

Similarly, when the lights of the traffic signals 111-2 and 111-4 are red, the recording mode changing device 100a changes the recording mode of the cameras 105-2 and 105-4 to a high image quality mode in which imaging is performed with higher image quality than usual. As a result, as illustrated in FIG. 3, the camera 105-2 can capture a vehicle or the like traveling in the intersecting direction of the intersection with high image quality. At this time, since the cameras 105-1 and 105-3 perform imaging in a normal mode with lower image quality than the high image quality mode, the amount of image data can be reduced as compared with the case where the entire cameras 105-1 to 105-4 are operated in the high image quality mode.

As described above, according to the recording mode changing device of the present example embodiment, it is possible to reduce the amount of image data obtained by a camera or the like installed on the road side or the like, and it is possible to effectively utilize a storage for recording data. By reducing the amount of data, it is also possible to reduce the cost required for data transmission and the load on the network.

In the examples of FIGS. 2 and 3, the description has been given assuming that the recording mode is changed when the traffic signal is turned on in red, but the timing of changing the recording mode is not limited thereto. For example, the recording mode may be changed at the timing when the traffic signal is turned on in yellow, blue, or green.

In the examples of FIGS. 2 and 3, an example of changing to the high image quality mode in which imaging is performed with higher image quality than usual has been described as the change in the recording mode, but the mode may be changed to a low image quality mode in which imaging is performed with lower image quality than usual. In this case, in the example of FIG. 2, the cameras 105-2 and 105-4 are operated in the low image quality mode. As a result, the images obtained by the cameras 105-2 and 105-4 have low image quality. However, regarding the traffic flow flowing between the traffic signals 111-2 and 111-4, since the cameras 105-1 and 105-3 perform imaging in the normal mode from the side, image data necessary for image analysis and the like can be obtained from these cameras.

Similarly, in the example of FIG. 3, the cameras 105-1 and 105-3 are operated in the low image quality mode. As a result, the images obtained by the cameras 105-1 and 105-3 have low image quality. However, since the traffic flow flowing between the traffic signals 111-1 and 111-3 is captured in the normal mode from the side by the cameras 105-2 and 105-4, image data necessary for image analysis and the like can be obtained from these cameras.

First Example Embodiment

Figure 4:
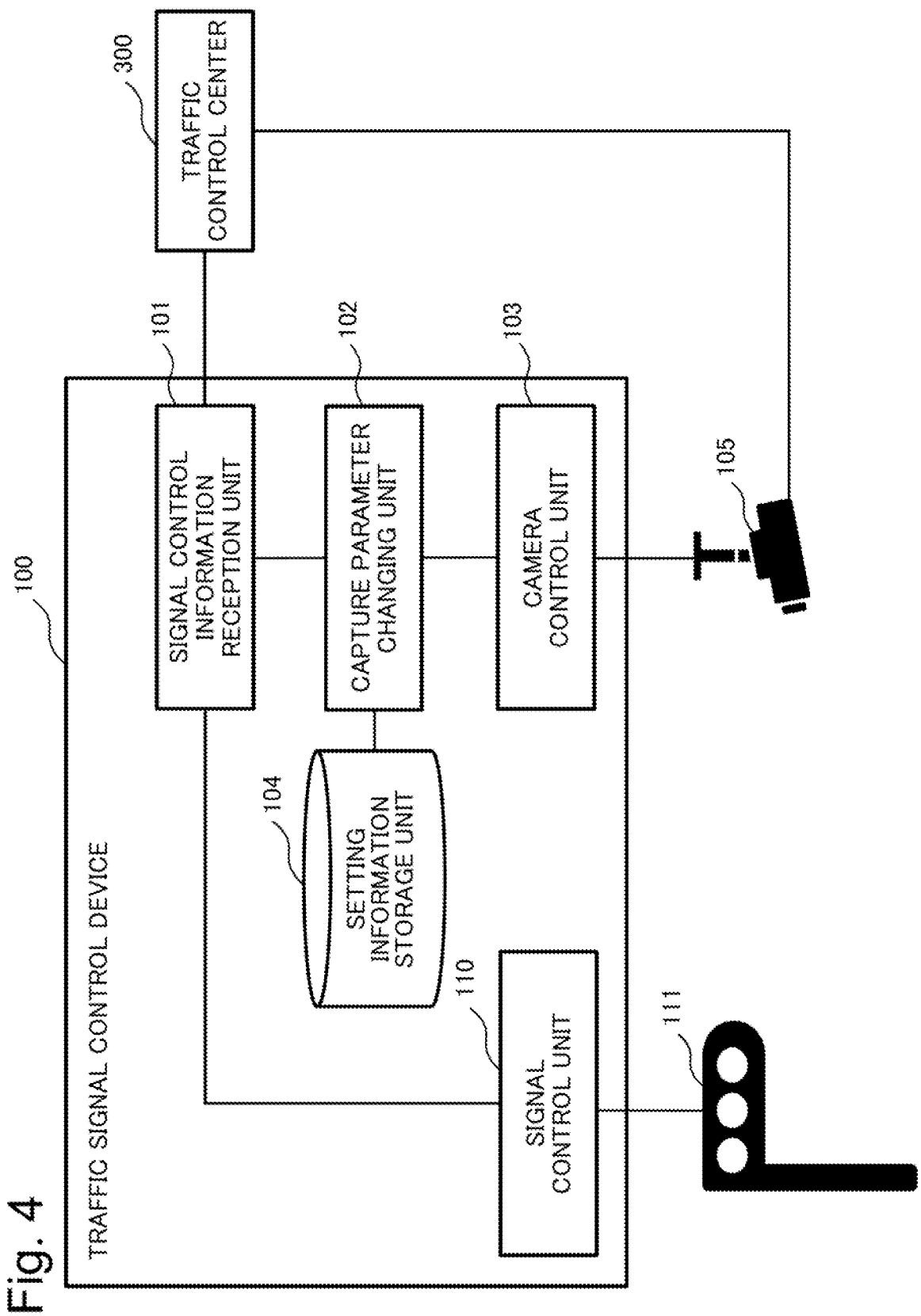
FIG. 4 is a diagram illustrating a system configuration according to a first example embodiment of the present invention.

Next, a first example embodiment of the present invention configured by adding the function of the above-described recording mode changing device to the traffic signal control device will be described in detail with reference to the drawings. FIG. 4 is a diagram illustrating a system configuration according to the first example embodiment of the present invention. Referring to FIG. 4, a traffic signal control device 100 connected to a camera 105, a traffic control center 300, and a traffic signal 111 is shown.

The traffic signal control device 100 includes a signal control information reception unit 101, a capture parameter changing unit 102, a camera control unit 103, a setting information storage unit 104, and a signal control unit 110.

The signal control information reception unit 101 receives signal control information from the traffic control center 300, and sends the received signal control information to the signal control unit 110 and the capture parameter changing unit 102.

The signal control unit 110 controls the traffic signal 111 on the basis of the signal control information received from the traffic control center 300 via the signal control information reception unit 101. Such a traffic signal 111 is also referred to as a "centralized controller" in Japan. In a case where a pedestrian traffic signal is provided at an intersection, the signal control unit 110 also controls the pedestrian traffic signal. The signal control information reception unit 101 and the signal control unit 110 described above can use the same configurations as those of the traffic signal control device 100 installed at an intersection or the like.

The capture parameter changing unit 102 changes the capture parameter of the camera 105 on the basis of the setting information read from the setting information storage unit 104 and the signal control information received from the traffic control center 300. Moreover, the capture parameter changing unit 102 notifies the camera control unit 103 of the changed capture parameter. Therefore, in the present example embodiment, the capture parameter changing unit 102 functions as a means configured to determine whether it is necessary to change the data recording mode of the predetermined camera according to the lighting state of the lamp of the predetermined traffic signal.

The setting information storage unit 104 stores setting information for the capture parameter changing unit 102 to determine the capture parameter on the basis of the signal control information. FIG. 5 is a diagram illustrating an example of the setting information stored in the setting information storage unit 104. FIG. 5 illustrates an example of the setting information in a form in which a stage number to be advanced by the signal control information is associated with the capture parameter. A remark column of FIG. 5 indicates the lighting state of the signal lamp shown in the camera 105. Among them, "all red" indicates a state in which the colors of all the lamps at the intersection are red. For example, in the case of a stage number 1, the signal control unit 110 turns on the traffic signal 111 (vehicle traffic signal) and the pedestrian traffic signal provided side by side with the traffic signal in green and blue light, respectively. At this time, the capture parameter changing unit 102 reads a resolution video graphics array (640×480 pixels, also simply noted 480 p) and a frame rate of 30 fps as capture parameters of the camera 105, and notifies the camera control unit 103 of the read parameters.

Thereafter, when the stages move forward and the stage number becomes 4, the signal control unit 110 turns on the traffic signal 111 (vehicle traffic signal) in yellow and turns on the pedestrian traffic signal in red. At this time, the capture parameter changing unit 102 reads the resolution as Full-HD (1920×1080 pixels, also simply noted 1080 p) and the frame rate of 60 fps as the capture parameters of the camera 105, and notifies the camera control unit 103 of the read parameters.

The camera control unit 103 controls the camera 105 so that imaging is performed with the capture parameter notified from the capture parameter changing unit 102. As a result, the change in the capture parameter in conjunction with the lighting state of the signal lamp is achieved. Therefore, in the present example embodiment, the camera control unit 103 functions as a means configured to change the data recording mode of the predetermined camera.

The traffic control center 300 transmits signal control information to the traffic signal control device 100 to control the traffic signal 111. The traffic control center 300 collects images captured by the camera 105 and grasps occurrence of traffic congestion and traffic accidents. At that time, since the image captured by the camera 105 is captured with an appropriate capture parameter according to the lighting state of the lamp, the traffic control center 300 can perform necessary monitoring and investigation without delay.

The camera 105 is, for example, a camera installed at a traffic signal or in the vicinity thereof so as to obtain an image in the intersection illustrated in FIGS. 2 and 3. The camera 105 captures an image under the control of the camera control unit 103. In the present specification, "capture" includes capturing of a still image in addition to capturing of a moving image (see FIG. 12 and the like).

Figure 6:
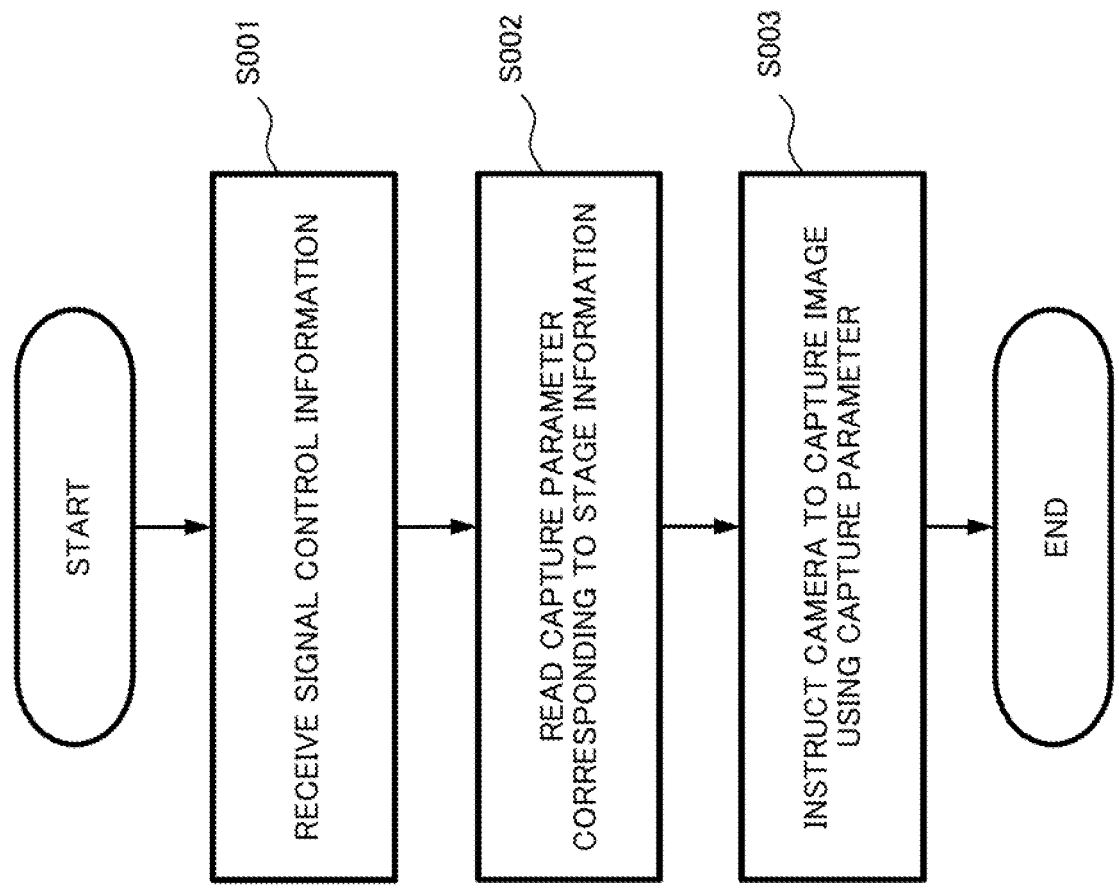
FIG. 6 is a flowchart illustrating an operation of the traffic signal control device according to the first example embodiment of the present invention.

Next, the operation of the present example embodiment will be described in detail with reference to the drawings. FIG. 6 is a flowchart illustrating an operation of the traffic signal control device according to the first example embodiment of the present invention. Referring to FIG. 6, first, the traffic signal control device 100 receives the signal control information from the traffic control center 300 (step S001).

Upon receiving the signal control information, the traffic signal control device 100 updates the stage number and controls the traffic signal 111. Further, the traffic signal control device 100 reads the capture parameter for the updated stage number from the setting information (step S002).

Next, the traffic signal control device 100 instructs the camera 105 to capture an image using the read capture parameter (step S003).

By the above operation, the traffic signal control device 100 selects the capture parameter according to the state of lighting of the traffic signal, and instructs the camera 105 to capture an image according to the capture parameter. As a result, it is possible to change at least some of the capture parameters of the image data of the camera 105 that captures the image in the intersection, and reduce the amount of data. For example, as illustrated in FIG. 5, when the signal light is green, the image quality of the image of the camera directed in the same direction as that of the lamp is degraded, so that the data reduction is achieved. On the other hand, when the signal light is other than green, it is possible to finely record the behavior of the vehicle in the direction crossing the camera 105 by increasing the image quality of the image of the camera directed in the same direction as the lamp.

In the first example embodiment described above, it has been described that the capture parameter is changed according to the stage number. However, regardless of the stage number, the traffic signal control device 100 may change the capture parameter according to the color of the light recognized from the signal control information.

In the first example embodiment described above, the description has been given assuming that the capture parameter is changed according to the advance of the stage number, but the stages may be further subdivided by time, and the traffic signal control device 100 may change the capture parameter for each time zone in the subdivided stages.

Further, in the setting information of FIG. 5 described above, the capture parameter is set for each combination of the vehicle signal and the pedestrian signal, but setting information that changes the capture parameter according to a change in one of the vehicle signal and the pedestrian signal can also be used. In a case where a signal other than the vehicle signal and the pedestrian signal is present at an intersection or the like, it is also possible to use setting information that changes the capture parameter for each combination with these other signals.

Second Example Embodiment

In the first example embodiment described above, an example in which the traffic signal 111 is directly controlled by the traffic control center 300 has been described, but the present invention can also be applied to traffic signals that are not directly controlled by the traffic control center 300, for example, traffic signals called constant cycle control signals. Hereinafter, a description will be given regarding a second example embodiment in which the capture parameter is changed according to turning on of a traffic signal which is not directly controlled by the traffic control center 300.

Figure 7:
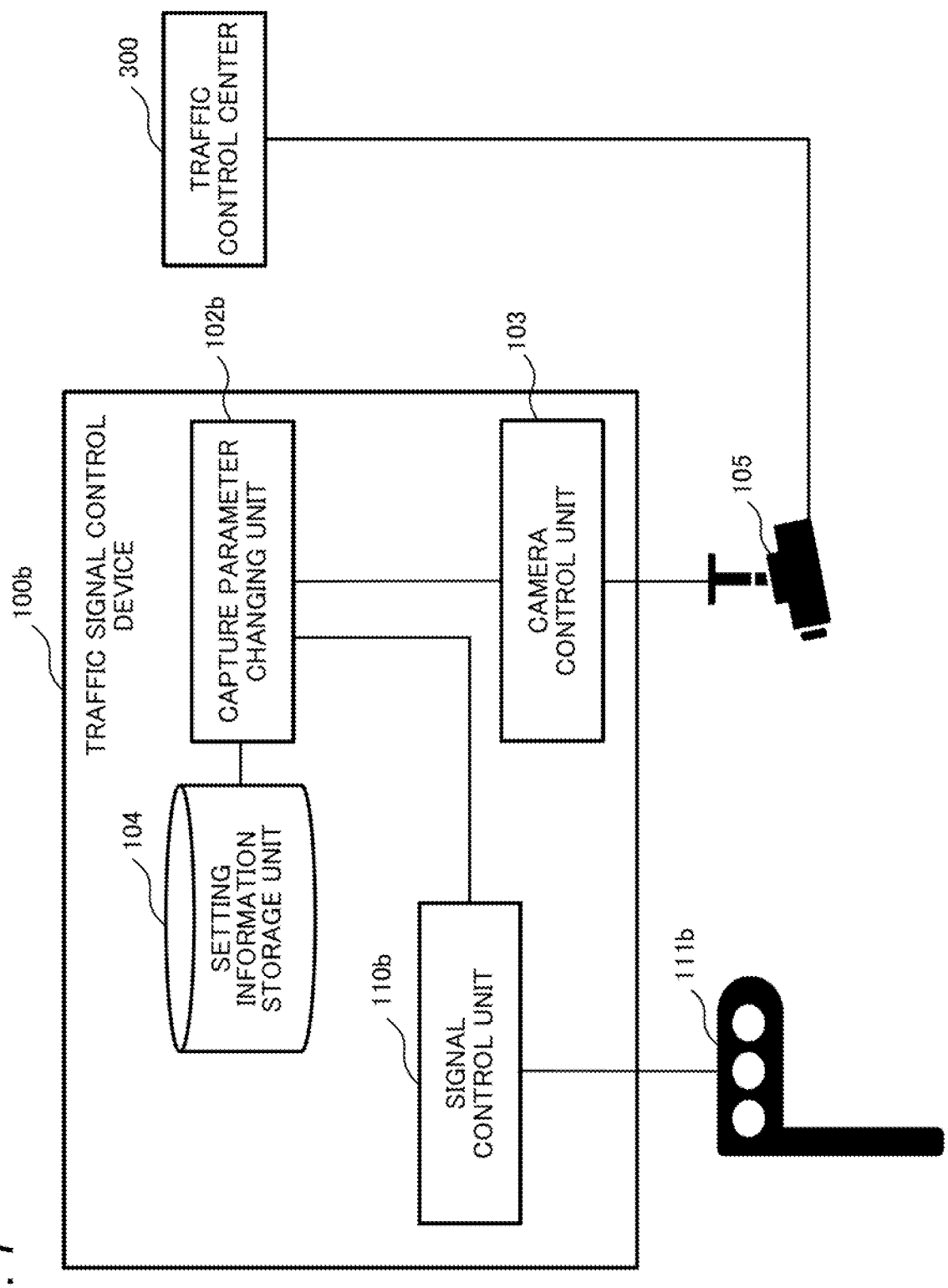
FIG. 7 is a diagram illustrating a system configuration according to a second example embodiment of the present invention.

FIG. 7 is a diagram illustrating a system configuration according to a second example embodiment of the present invention. A major difference in configuration from the first example embodiment illustrated in FIG. 4 is that a traffic signal control device 100*b* controls a traffic signal 111*b* without being controlled by the traffic control center 300. Since the other configurations are similar to those of the first example embodiment, differences thereof will be mainly described below.

A signal control unit 110*b* controls the traffic signal 111*b* so as to perform a lighting pattern (also referred to as an indicating configuration) at a preset cycle. The signal control unit 110*b* may be connected to a sensor (detector; not illustrated) to perform sensitive control of changing a lighting pattern according to the presence or absence of a vehicle or a pedestrian. The control content from the signal control unit 110*b* is also provided to a capture parameter changing unit 102*b*.

The capture parameter changing unit 102*b* changes the capture parameter of the camera 105 on the basis of the setting information read from the setting information storage unit 104 and the signal control information provided from the signal control unit 110*b*. For example, similarly to the first example embodiment, the capture parameter changing unit 102*b* changes the capture parameter by reading the capture parameter associated to the stage number to be advanced by the signal control information from the setting information.

Since other operations are similar to those of the first example embodiment, the description thereof will be omitted. As described above, according to the configuration of the present example embodiment, it is possible to switch the capture parameter of the camera 105 that captures an image of an intersection or the like where the traffic signal 111*b* not controlled by the traffic control center 300 is installed according to the state of lighting, and perform image capturing.

Third Example Embodiment

In the first and second example embodiments described above, it has been described that the traffic signal control device is connected to the camera 105 to change the capture parameter, but a case where the traffic signal control device and the camera control device are configured by different devices is also assumed. In that case, it is also assumed that the camera control device cannot receive the signal control information from the traffic signal control device. Hereinafter, a third example embodiment assuming a case where the traffic signal control device and the camera control device are configured by different devices will be described.

Figure 8:
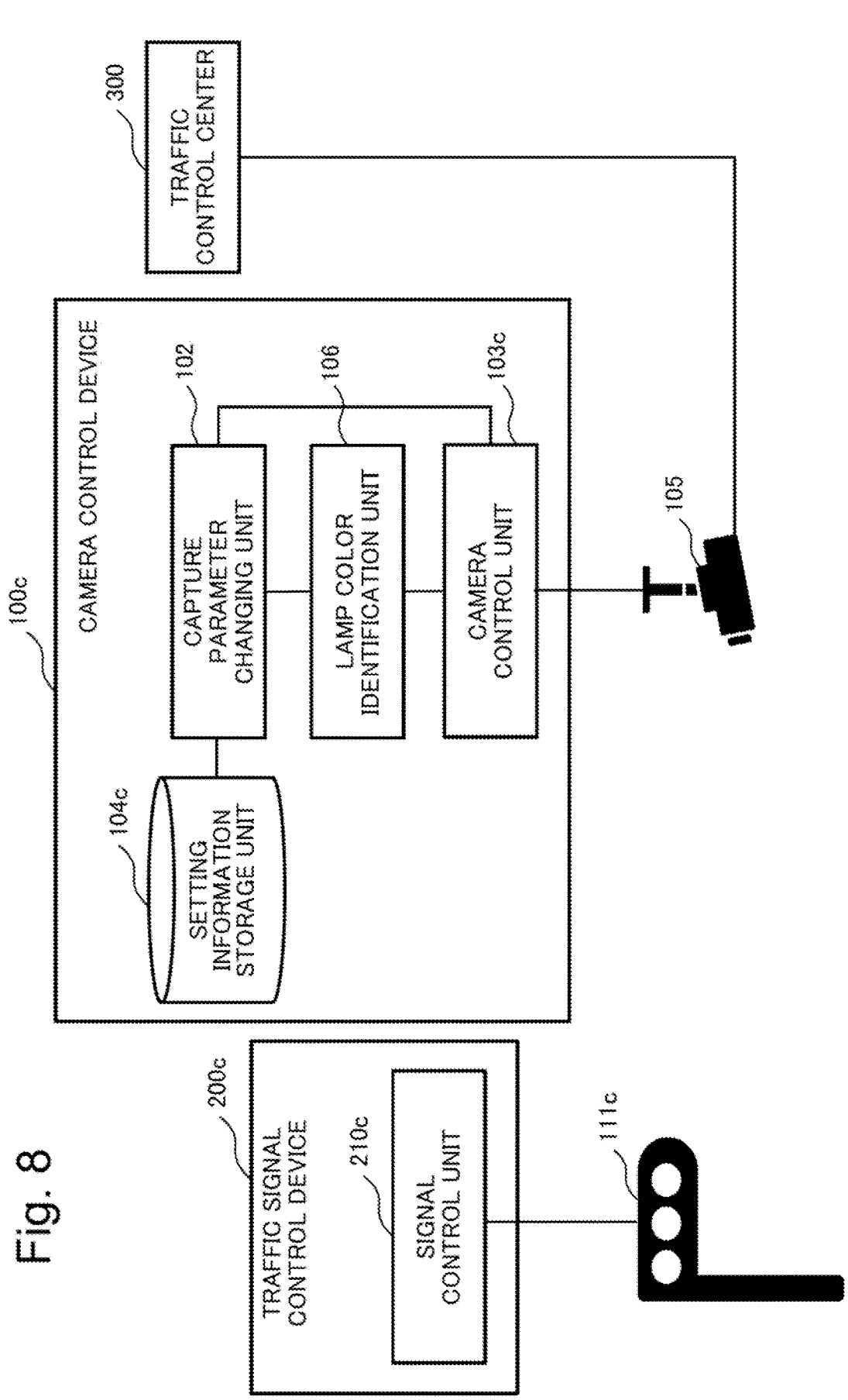
FIG. 8 is a diagram illustrating a system configuration according to a third example embodiment of the present invention.

FIG. 8 is a diagram illustrating a system configuration according to the third example embodiment of the present invention. A major difference in configuration from the second example embodiment illustrated in FIG. 7 is that a traffic signal control device 200*c* and a camera control device 100*c* are configured as separate independent devices. Therefore, the camera control device 100*c* includes a lamp color identification unit 106 for grasping the lighting state of the lamp of the traffic signal instead of the signal control information.

The traffic signal control device 200*c* is a device that includes a signal control unit 210*c* and controls a traffic signal 111*c* without being controlled by the traffic control center 300. The signal control unit 210*c* is similar to the signal control unit 110*b* of the second example embodiment, and controls the traffic signal 111*c* so as to perform a lighting pattern (also referred to as an indicating configuration) at a preset cycle.

The camera control device 100*c* includes a capture parameter changing unit 102, a lamp color identification unit 106, a camera control unit 103*c*, and a setting information storage unit 104*c*.

In addition to the control of the camera 105, the camera control unit 103*c* can provide an image captured by the camera 105 to the lamp color identification unit 106.

The lamp color identification unit 106 identifies the lighting state of the lamp of the traffic signal 111*c* from the image of the traffic signal 111*c* captured in the image provided from the camera control unit 103*c*, and sends the result to the capture parameter changing unit 102. Therefore, the lamp color identification unit 106 functions as a means configured to identify the lighting state of the lamp of the traffic signal from the image of the camera 105.

The setting information storage unit 104*c* stores setting information for changing the capture parameter regardless of the signal control information. FIG. 9 is a diagram illustrating an example of the setting information held in the setting information storage unit 104*c* according to the present example embodiment. In the example of FIG. 9, an example of setting information in which the lighting pattern of the lamp as the change condition of the capture parameter is associated with the capture parameter to be selected is illustrated.

The capture parameter changing unit 102 refers to the setting information held in the setting information storage unit 104*c* and selects a capture parameter suitable for the lighting state of the lamp received from the lamp color identification unit 106. Moreover, the capture parameter changing unit 102 notifies the camera control unit 103*c* of the selected capture parameter. For example, when both the vehicle signal is green and the pedestrian signal is blue, the capture parameter changing unit 102 selects VGA (480 p) and 30 fps as the capture parameters. Then, the camera control unit 103*c* instructs the camera 105 to capture an image according to the capture parameter.

Thereafter, when the lighting color of the traffic signal 111*c* changes, the vehicle signal turns yellow, and the pedestrian signal turns red, the capture parameter changing unit 102 selects Full-HD (1080 p) and 60 fps as the capture parameters. Then, the camera control unit 103c instructs the camera 105 to capture an image according to the capture parameter. In the example of FIG. 9, even in a case where both the vehicle signal and the pedestrian signal turn red, imaging with Full-HD (1080 p) and 60 fps is continued, and when the vehicle signal turns green and the pedestrian signal turns blue again, imaging with VGA (480 p) and 30 fps is performed.

As described above, even when the control content of the traffic signal control device 200c for the traffic signal 111c cannot be acquired in real time, according to the configuration of the present example embodiment, it is possible to change the capture parameter according to the lighting state of the lamp of the traffic signal similarly to the first and second example embodiments. In the third example embodiment, it has been described that the traffic signal 111c is not a direct control target of the traffic control center 300, but the traffic signal 111c may be a control target of the traffic control center 300. In this case, a control line is added between the traffic control center 300 and the traffic signal control device 200c in FIG. 8.

In the example illustrated in FIG. 9, the combination of the lighting states of the lamps of the traffic signals and the capture parameter are combined, and the capture parameter is changed when the lighting state of the lamp of the traffic signal becomes a predetermined pattern. However, the change timing of the capture parameter may be shifted by a certain amount. For example, even after the vehicle signal changes to green and the pedestrian signal changes to blue, imaging with the previous capture parameters may be continued for a predetermined period (for example, about several seconds). As a result, it is possible to capture an image of the inside of an intersection in a so-called all-red state with high image quality and record, with high image quality, a vehicle or the like that has ignored a signal or has left for a final departure. In this manner, the data recording mode can be changed at a predetermined timing based on the change in the lighting state of the lamp of the traffic signal.

Fourth Example Embodiment

The signal control device and the camera control device of the first to third example embodiments described above can be integrated with a camera to be configured as a network camera. A fourth example embodiment will be described in detail with reference to the drawings, in which a network camera is provided with a function of changing a capture parameter according to the lighting state of the light of the traffic signal.

Figure 10:
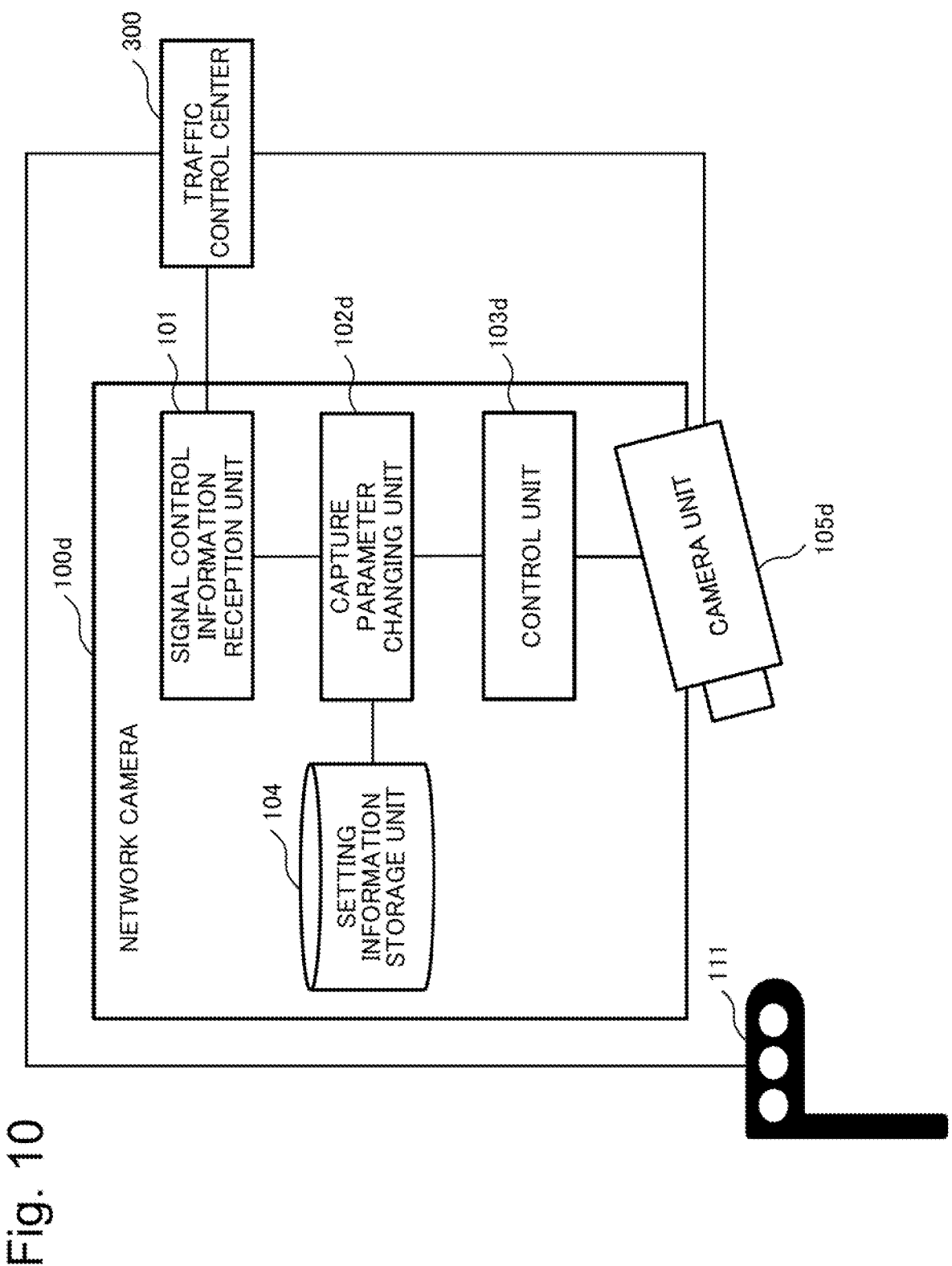
FIG. 10 is a diagram illustrating a system configuration according to a fourth example embodiment of the present invention.

FIG. 10 is a diagram illustrating a system configuration according to the fourth example embodiment of the present invention. Referring to FIG. 10, a configuration of a network camera 100d including a signal control information reception unit 101, a capture parameter changing unit 102d, a control unit 103d, and a setting information storage unit 104 is illustrated. Since the signal control information reception unit 101 and the setting information storage unit 104 are similar to the traffic signal control device 100 of the first example embodiment, the description thereof will be omitted.

The capture parameter changing unit 102d changes the capture parameter on the basis of the setting information read from the setting information storage unit 104 and the signal control information received from the traffic control center 300. Moreover, the capture parameter changing unit 102d notifies the control unit 103d of the changed capture parameter.

The control unit 103d controls a camera unit 105d to perform imaging with the capture parameter notified from the capture parameter changing unit 102d.

The camera unit 105d is connected to the traffic control center 300 and provides image data to the traffic control center 300.

As described above, the present invention can also be achieved by a single network camera having a function equivalent to that of the traffic signal control device (recording mode changing device) of the first example embodiment. In the example of FIG. 10, it has been described that the network camera 100d can acquire the signal control information transmitted from the traffic control center 300 to the traffic signal 111, but a case where the network camera cannot acquire the signal control information is also assumed. In this case, similarly to the third example embodiment, a lamp color identification unit may be added so that the lighting state of the light of the traffic signal can be grasped by the network camera alone.

Figure 11:
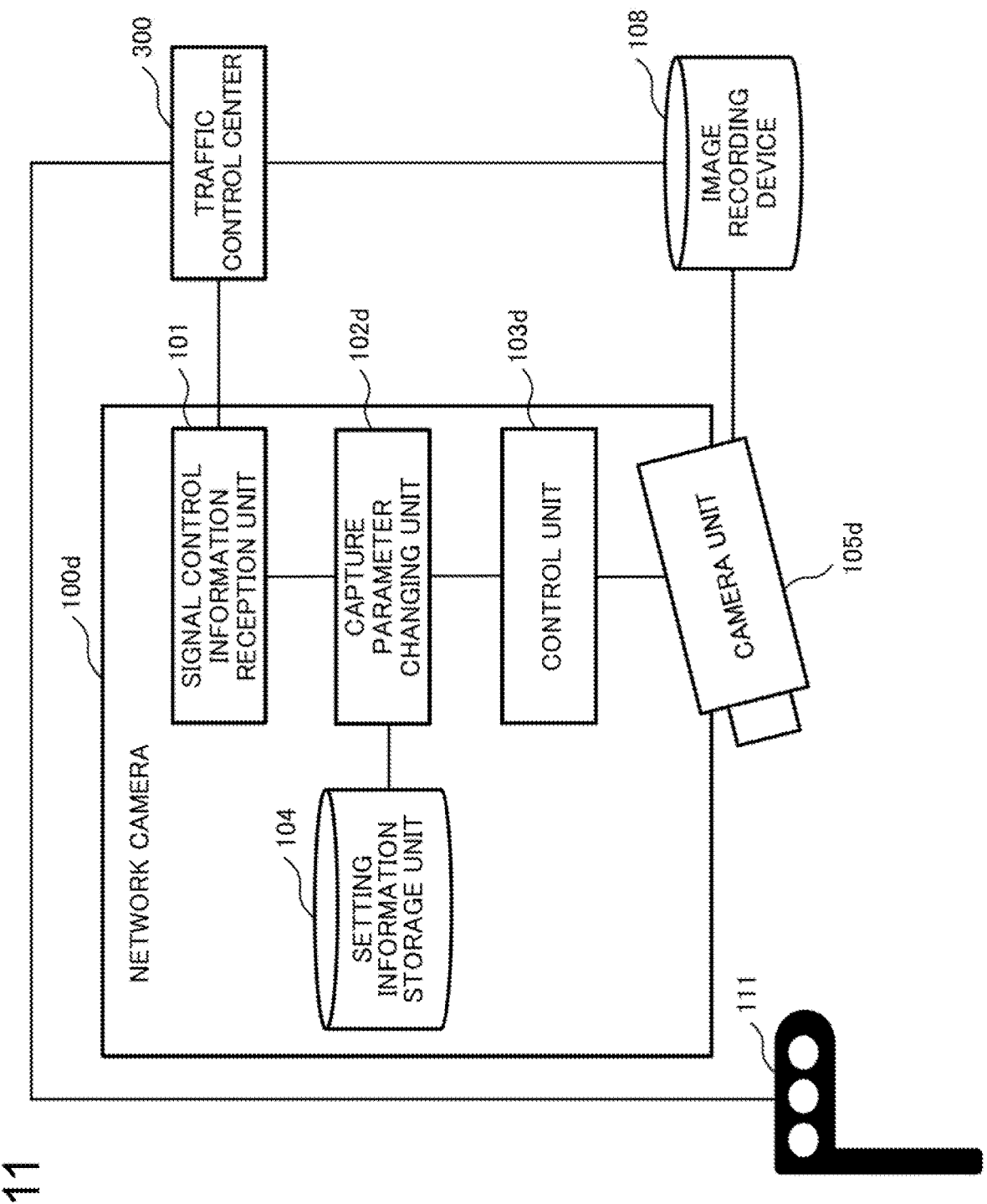
FIG. 11 is a diagram illustrating a modification of the fourth example embodiment of the present invention.

In the example of FIG. 10, the network camera 100d directly transmits image data to the traffic control center 300. However, as illustrated in FIG. 11, an image recording device 108 that accumulates image data received from the network camera 105d may be arranged between the network camera 100d and the traffic control center 300. In this case, the traffic control center 300 accesses the image recording device 108 and refers to necessary data.

Although the example embodiments of the present invention have been described above, the present invention is not limited to the above-described example embodiments, and further modifications, substitutions, and adjustments can be made without departing from the basic technical idea of the present invention. For example, the device configuration, the configuration of each element, and the expression form of data and the like illustrated in the drawings are examples for assisting the understanding of the present invention, and are not limited to the configurations illustrated in the drawings. For example, in the first to fourth example embodiments described above, it has been described that the cameras 105 and 105d capture images in intersections, but the positions of the cameras 105 and 105d are not limited thereto. For example, even in a camera located away from a traffic signal, it may be better to change a data recording mode according to the state of lighting of the traffic signal. For example, there is a case where a camera is installed in a pedestrian crossing located away from a traffic signal, a store facing a road, or a parking lot. The present invention can also be applied to a change in a recording mode for these cameras.

Similarly to the modification of the fourth example embodiment illustrated in FIG. 11, also in the configuration illustrated in FIGS. 4, 7, and 8, an image recording device that accumulates image data received from the camera 105 may be arranged between the camera 105 and the traffic control center 300. In this case, the traffic control center 300 accesses the image recording device and refers to necessary data.

The camera in the above-described example embodiment may be a camera (traffic flow measuring camera, signal camera) constituting a so-called traffic infrastructure installed in a lamp housing of a traffic signal or attached to the housing as in PTL 1. A mode in which data captured by the camera is transmitted to the traffic control center 300 via the nearest base station can also be adopted. These base stations may be base stations of long term evolution (LTE)

or a fifth generation mobile communication system (5G). Further, these base stations may have functions as the recording mode changing device and the traffic signal control device of the present invention.

In the above-described example embodiment, an example of changing the capture parameter using the setting information has been described. However, the recording mode changing device, the traffic signal control device, and the network camera can change and set the capture parameter from another viewpoint. For example, these devices may change the capture parameters on the basis of the day of the week, the time zone, or the like. In this way, it is possible to appropriately perform monitoring in a time when there are many accidents and a commuting time.

In the above-described example embodiment, it has been described that the image captured by the camera 105 is transmitted to the traffic control center 300, but these devices may transmit image data to other entities. For example, these devices may transmit images or the like recorded by changing capture parameters to a data management system (business operator) that collects, analyzes, and provides traffic-related data. For example, these devices may directly transmit image data to other traffic infrastructure or vehicles.

In each of the above-described example embodiments, an example of changing the capture parameter of the camera 105 has been described as one of the recording modes. However, the recording mode changing device or the like may change a parameter other than the capture parameter. For example, by using the setting information as illustrated in FIG. 12, it is possible to cause the camera 105 to perform an operation of switching between time-lapse imaging (interval imaging at predetermined intervals of n seconds) and Full-HD imaging.

In each of the above-described example embodiments, it has been described that when the traffic signal 111 (vehicle traffic signal) is turned on in green light and the pedestrian traffic signal is turned on in blue light, imaging is performed at a low resolution and a low frame rate, but the setting information can be changed according to the purpose of use of the camera and the image data. For example, in a case where the installation purpose of the camera 105 is reading a license plate or estimating the vehicle type or the attribute of a character, an image facing the front with respect to the camera is more important. As illustrated in FIG. 13, the setting information in this case may be a content to be imaged at a high resolution and a high frame rate when the traffic signal 111 (vehicle traffic signal) is turned on in green light and the pedestrian traffic signal is turned on in blue light.

In each of the above-described example embodiments, an example in which the resolution and the frame rate are changed as the capture parameters of the camera has been described, but the capture parameters of the camera are not limited to these two. For example, a compression rate, a bit rate at the time of encoding, the presence or absence of application of high dynamic range (HDR) processing, the presence or absence of noise reduction processing, the selection of color/monochrome, and the like may be made changeable.

Figure 14:
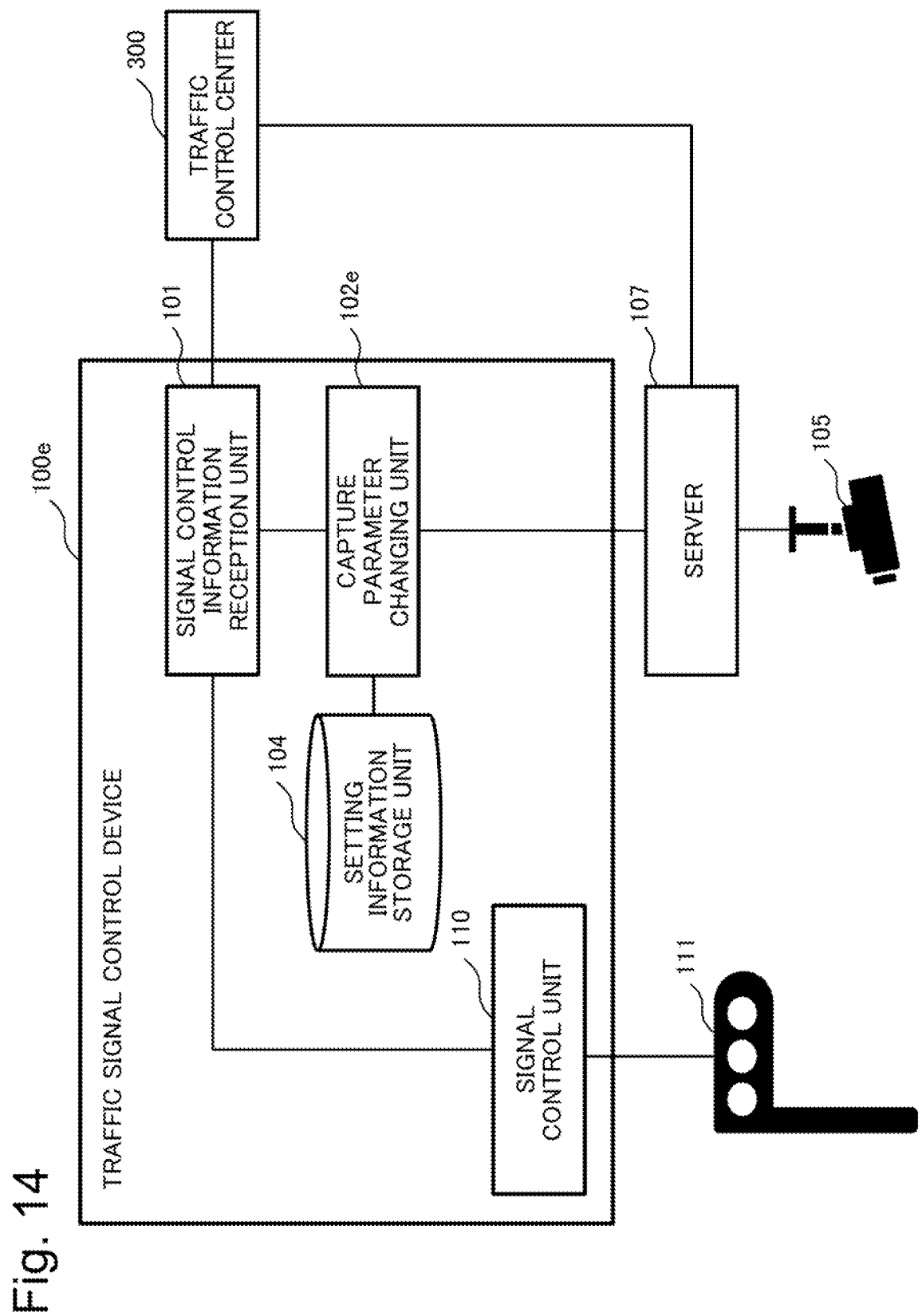
FIG. 14 is a diagram illustrating a system configuration according to a fifth example embodiment of the present invention.

As illustrated in FIG. 14, a mode in which a server 107 such as a mobile edge computing (MEC) server is arranged between the camera and the traffic control center 300 is also assumed. The present invention can also be applied to such a configuration, and in this case, a capture parameter changing unit 102e notifies the server 107 of the capture parameter. The server 107 controls the camera using the capture parameter communicated from a traffic signal control device 100e. In the configuration illustrated in FIG. 14, a mode is also assumed in which the server 107 re-compresses image data or changes the bit rate of an image to be transmitted to the traffic control center 300. By adding the compression rate and the bit rate of the image data as the setting information, it is possible to obtain a configuration that instructs the server 107 to change the compression rate and the bit rate of the image data according to the lighting state of the lamp of the traffic signal. According to these modes, it is possible to reduce a processing load on the traffic signal control device.

As still another mode, an encoding unit may be disposed in the traffic signal control device, and compression and a bit rate of image data may be changed in the encoding unit. Even in such a configuration, the amount of image data can be reduced similarly to the first to fourth example embodiments. The encoding unit can be achieved not only as a program (software) operating on a computer but also by hardware such as a field-programmable gate array (FPGA).

Figure 15:
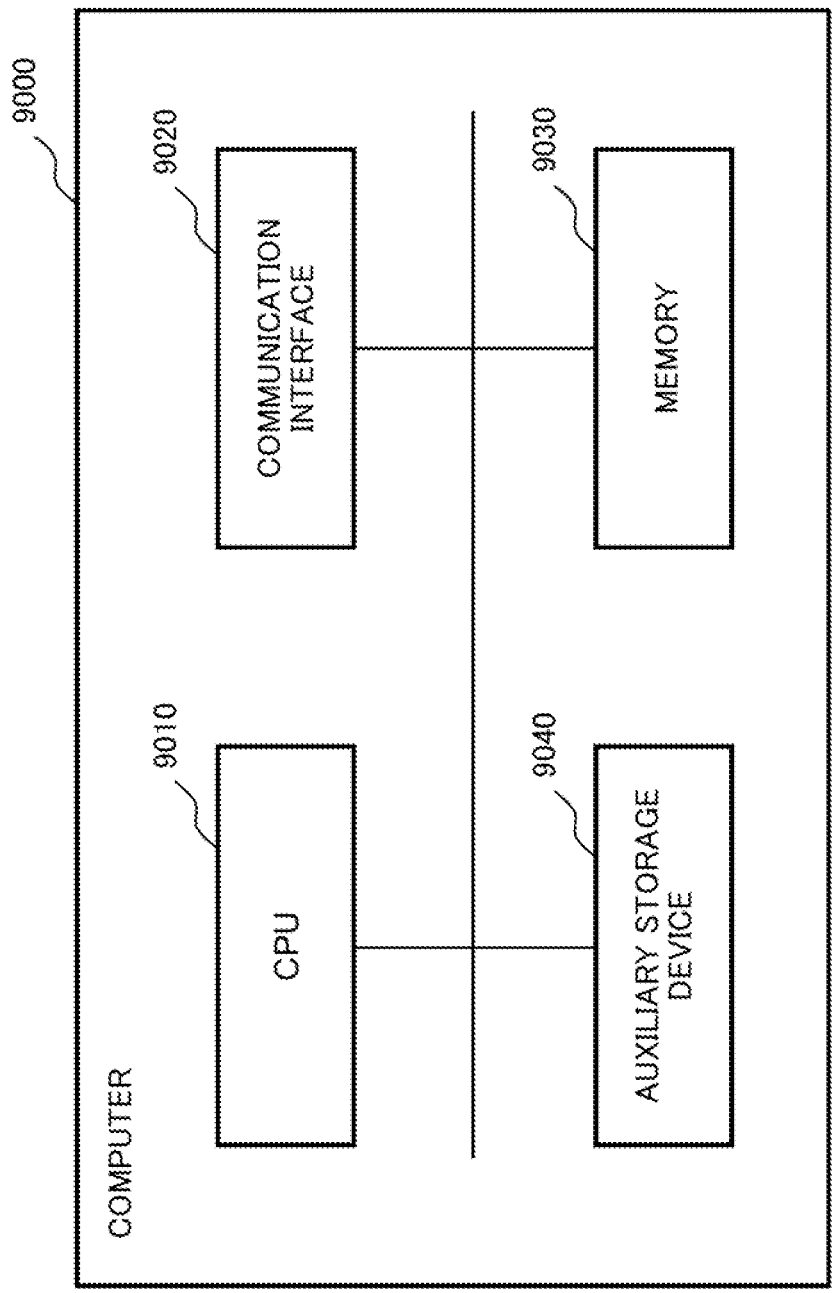
FIG. 15 is a diagram illustrating a configuration of a computer that can function as a control device of the present invention.

The procedure in each of the above-described example embodiments can be implemented by a program for causing a computer (9000 in FIG. 15) that functions as a traffic signal control device, a recording mode changing device, or a network camera to implement functions of these devices. Such a computer is exemplified in a configuration including a central processing unit (CPU) 9010, a communication interface 9020, a memory 9030, and an auxiliary storage device 9040 in FIG. 15. That is, the CPU 9010 of FIG. 15 may execute the capture parameter change program and the camera control program.

That is, each unit (processing means and function) of the traffic signal control device, the recording mode changing device, and the network camera described above can be achieved by a computer program that causes a processor mounted on these devices to execute each processing described above using hardware thereof.

Finally, preferred forms of the present invention are summarized.

[First Aspect]
(See the recording mode changing device from the first viewpoint)

[Second Aspect]
The recording mode changing device described above can adopt a configuration for changing the data recording mode by using the stage information indicating the lighting state of the lamp of the traffic signal.

[Third Aspect]
In the recording mode changing device,
it is possible to adopt a configuration in which the data recording mode is changed at a predetermined timing based on a change in a lighting state of a lamp of the traffic signal.

[Fourth Aspect]
In the recording mode changing device,
it is possible to adopt a configuration in which
the predetermined camera is disposed at a position where a lamp of the traffic signal can be captured, and
the recording mode changing device includes:
a means configured to identify a lighting state of a lamp of the traffic signal from an image of the camera.

[Fifth Aspect]
In the recording mode changing device,
a change in the data recording mode can include a change in at least one of resolution and a frame rate.

[Sixth Aspect]
In the recording mode changing device, a change in the data recording mode can include switching between recording by a moving image and recording by a still image.

[Seventh Aspect]

In the recording mode changing device,
it is possible to adopt a configuration in which
the predetermined camera is a camera installed to capture an intersection, and
a data recording mode of the camera is changed according to a lighting state of a lamp of a traffic signal at the intersection.

[Eighth Aspect]

(See the network camera from the second viewpoint)

[Ninth Aspect]

(See the program from the third viewpoint)

[Tenth Aspect]

(See the program from the fourth viewpoint)

The eighth and tenth modes can be developed into the second to seventh modes similarly to the first mode.

The disclosure of the above patent literature is incorporated herein by reference. Within the frame of the entire disclosure (including claims) of the present invention, it is possible to change and adjust the example embodiments or examples further on the basis of the basic technical idea. Various combinations or selections (including partial deletions) of various disclosure elements (each element of each claim, each element of each example embodiment or example, each element of each drawing, and the like are included) can be made within the frame of the disclosure of the present invention. That is, it is a matter of course that the present invention includes various modifications and corrections that can be made by those of ordinary skill in the art in accordance with the entire disclosure including the claims and the technical idea. In particular, for numerical ranges set forth herein, any numerical value or sub-range included within the range should be construed as being specifically described, even if not stated otherwise.

REFERENCE SIGNS LIST 100a recording mode changing device
100, 100b, 100d, 100e, 200c traffic signal control device
100c camera control device
101 signal control information reception unit
101a determination unit
102, 102b, 102d, 102e capture parameter changing unit
102a recording mode changing unit
103, 103c camera control unit
103d control unit
104, 104c setting information storage unit
105, 105a, 105d, 105-1 to 105-4 camera
106 lamp color identification unit
107 server
108 image recording device
110, 110b, 210c signal control unit
111, 111b, 111c, 111-1 to 111-4 traffic signal
300 traffic control center
9000 computer
9010 CPU
9020 communication interface
9030 memory
9040 auxiliary storage device

What is claimed is:

1. A recording mode changing device comprising:
a memory storing instructions; and
one or more processors configured to execute the instructions to:
determine whether it is necessary to change a data recording mode of a camera according to a lighting state of a lamp of a traffic signal; and
change a data recording mode of the predetermined camera according to the determination, including, in case that the lighting state of the lamp is blue, reducing an amount of data recorded by the camera directed in a same direction as that of the lamp, and in case that the lighting state of the lamp is other than blue, increasing the amount of data recorded by the camera directed in the same direction as that of the lamp.

2. The recording mode changing device according to claim 1, wherein
the one or more processors are further configured to execute the instructions to:
change the data recording mode by using stage information indicating a combination of a lighting state of a lamp of a vehicle traffic signal and a pedestrian traffic signal.

3. The recording mode changing device according to claim 1, wherein
the one or more processors are further configured to execute the instructions to:
change the data recording mode at a predetermined timing, the predetermined timing based on a change in the lighting state of the lamp of the traffic signal.

4. The recording mode changing device according to claim 1, wherein
the camera is positioned to be able to capture the lamp of the traffic signal, and wherein
the one or more processors are further configured to execute the instructions to
identify the lighting state of the lamp of the traffic signal from an image captured by the camera.

5. The recording mode changing device according to claim 1, wherein the change in the data recording mode includes a change in at least one of resolution and a frame rate.

6. The recording mode changing device according to claim 1, wherein the change in the data recording mode includes switching between recording by a moving image and recording by a still image.

7. The recording mode changing device according to claim 1, wherein
the camera is installed to capture an intersection, and wherein
the one or more processors are further configured to execute the instructions to:
change the data recording mode of the camera according to the lighting state of the lamp of the traffic signal at the intersection.

8. A recording mode changing method performed by a computer and comprising:
determining whether it is necessary to change a data recording mode of a camera according to a lighting state of a lamp of a traffic signal; and
changing a data recording mode of the predetermined camera according to the determination, including, in case that the lighting state of the lamp is blue, reducing an amount of data recorded by the camera directed in a same direction as that of the lamp, and in case that the lighting state of the lamp is other than blue, increasing the amount of data recorded by the camera directed in the same direction as that of the lamp.

9. A non-transitory computer-readable recording medium storing a program executable by a computer to perform processing comprising:

determining whether it is necessary to change a data recording mode of a camera according to a lighting state of a lamp of a traffic signal; and changing a data recording mode of the predetermined camera according to the determination, including, in case that the lighting state of the lamp is blue, reducing an amount of data recorded by the camera directed in a same direction as that of the lamp, and in case that the lighting state of the lamp is other than blue, increasing the amount of data recorded by the camera directed in the same direction as that of the lamp.

* * * * *